March 13, 1934. N. M. HANSEN ET AL 1,950,607
TESTING APPARATUS
Filed Oct. 25, 1924 3 Sheets-Sheet 1
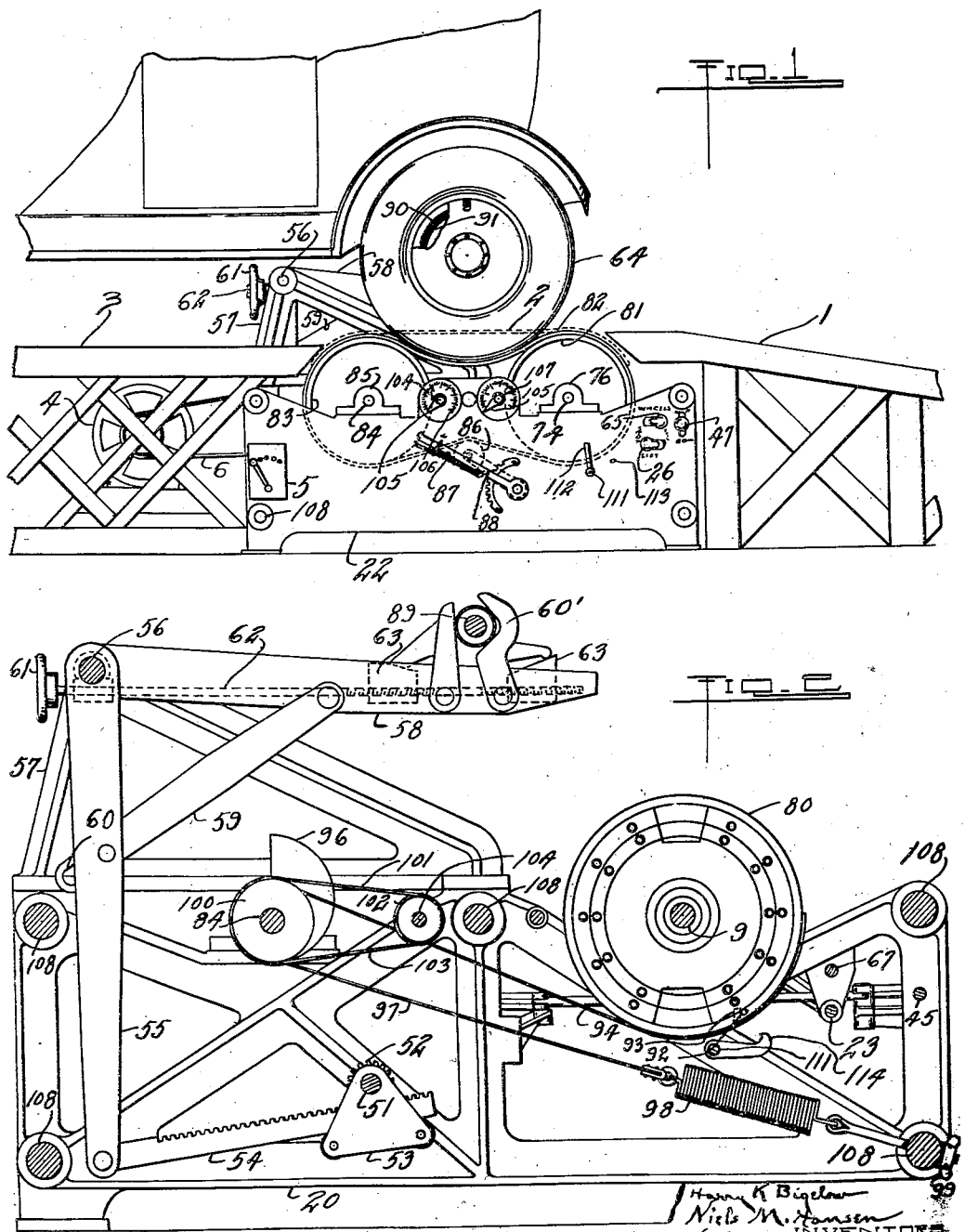

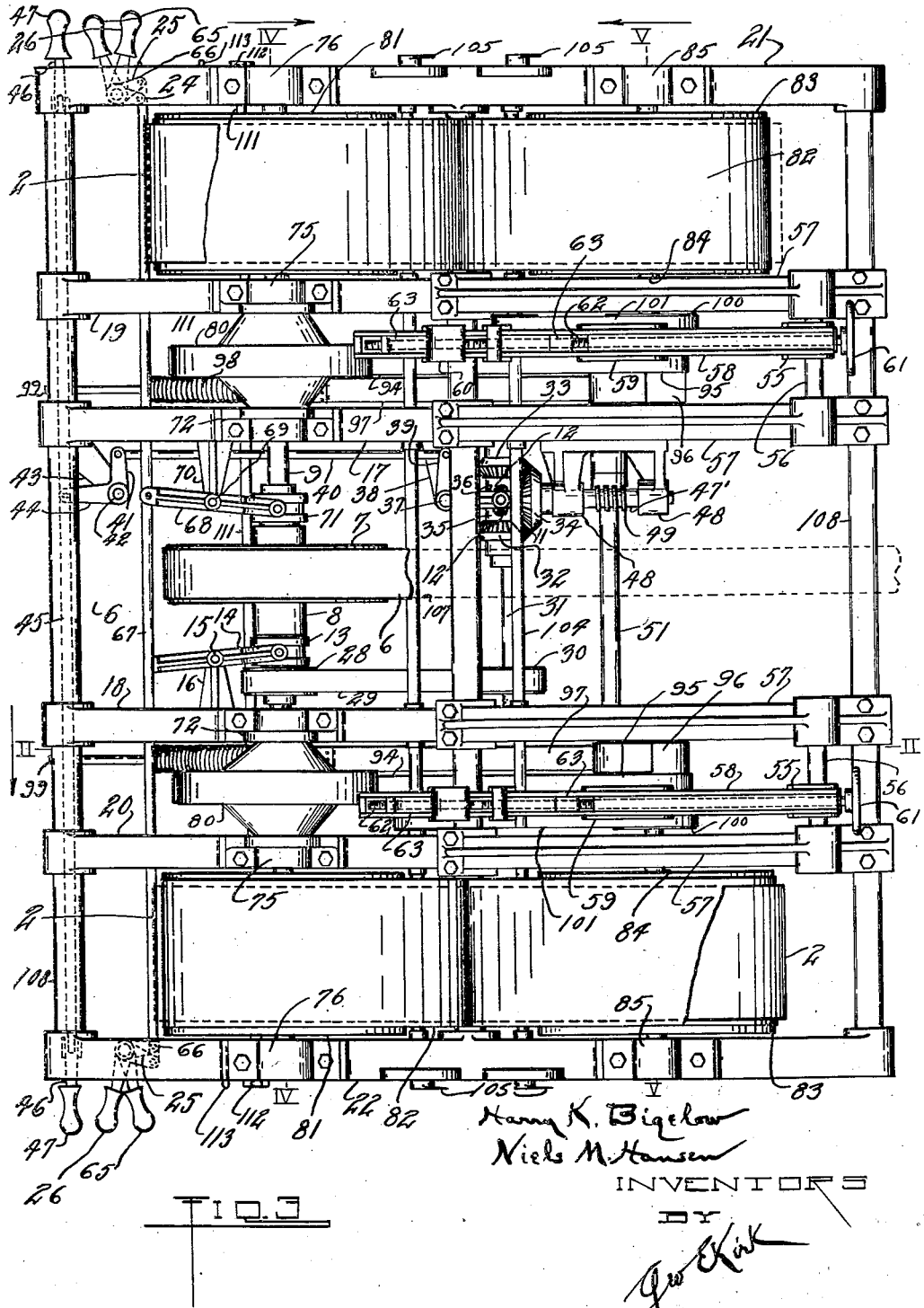

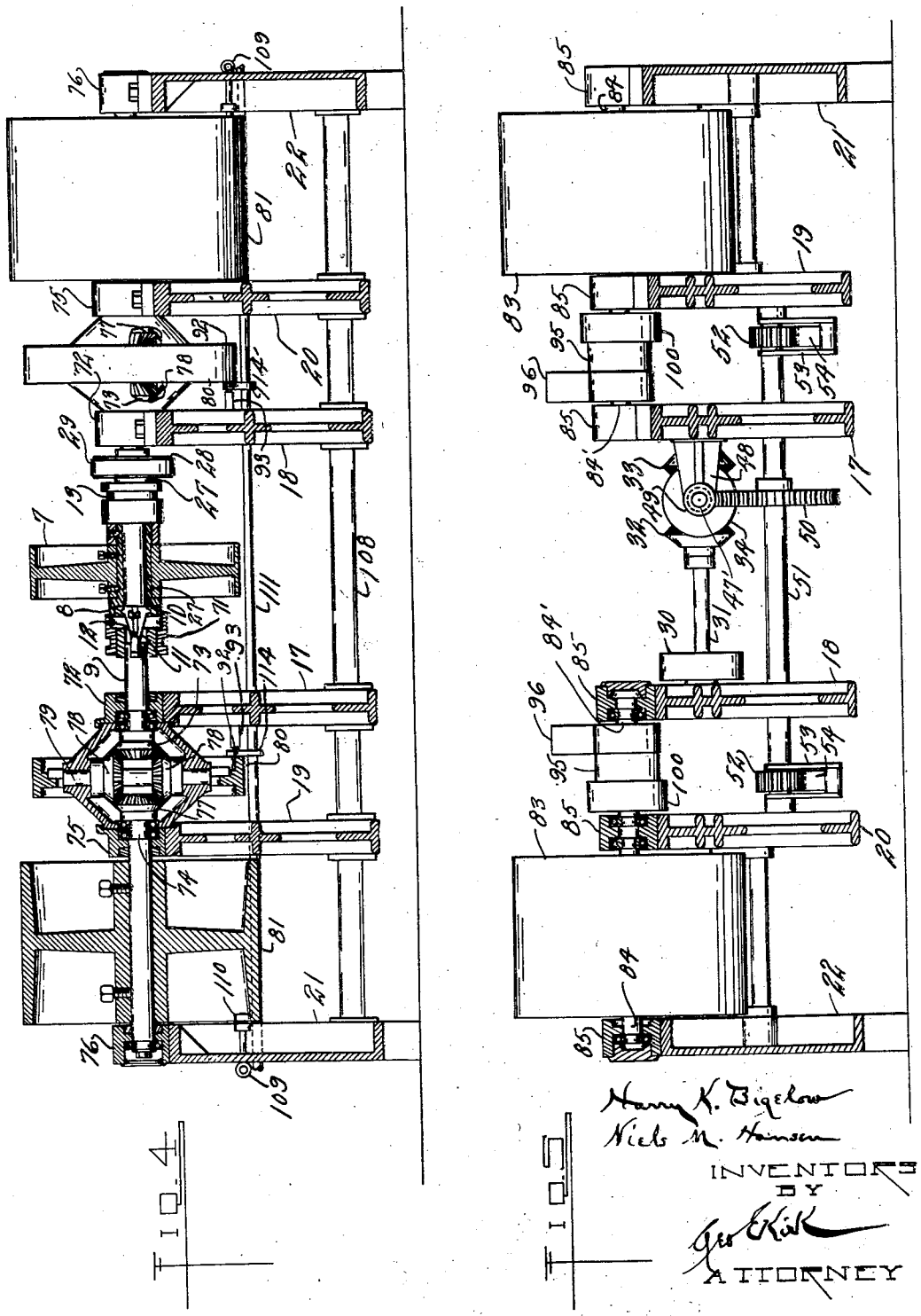

Patented Mar. 13, 1934

1,950,607

UNITED STATES PATENT OFFICE 1,950,607

TESTING APPARATUS

Niels M. Hansen and Harry K. Bigelow, Toledo, Ohio, assignors, by mesne assignments, to Bendix-Cowdrey Brake Tester, Inc., New York, N. Y., a corporation of Delaware Application October 25, 1924, Serial No. 745,920

47 Claims. (Cl. 265—25)

This invention relates to brake holding testing equipment.

This invention has utility when incorporated in propulsion apparatus for giving a live driving action as a load against which a brake may be applied for checking the brake setting or holding, as for motor vehicles. It is apparent that in vehicle operation the brake has not as its purpose to check the speed of the motor, but with the motor cut off and the car proceeding, the primary purpose of the brake is to retard the travel of the car as under momentum in the driving action of the road wheels. This apparatus is designed for checking such actual operating conditions.

Referring to the drawings:

Fig. 1 is a side elevation, with parts broken away, of an embodiment of the invention in a brake holding testing apparatus for motor vehicles;

Fig. 2 is a fragmentary view of features of the dynamometer retarding device and jack on the lines II—II, Fig. 3, looking in the direction of the arrow;

Fig. 3 is a plan view of the cradle portion of the device, parts being broken away;

Fig. 4 is a section on the line IV—IV, Fig. 3, showing the main driving pulley and clutch connections therefrom to the pair of dynamometers; and Fig. 5 is a section on the line V—V, Fig. 3, showing features of the cradle mounting and reversible drive for the jack pair.

If it be desired to test the brake action on front wheels of a motor vehicle, such vehicle might be run up incline 1 (Fig. 1). If it be desired to check up the brake holding action of the rear wheels of the motor vehicle, such may be effected by running the vehicle forward end up the incline 1 and carrying such wheels therefrom over removable platform section 2 to main platform section 3. With the vehicle thus in position, where the apparatus of this disclosure is shown lifted instead of built into place, the removable platform sections 2 may be taken out to allow the particular pair of wheels which are to be tested as to their brake or brakes to rest upon the respective cradles.

Motor 4 is shown as controlled by speed varying switch 5 to drive belt 6 (Fig. 1) about pulley 7 (Fig. 3), as a main driving member. This pulley 7 is fixed with sleeve 8 loosely mounted on shaft 9. Split ring 10 (Fig. 4) may be spread by levers 11 thrown by axially movable wedge 12 carried by collar 13 (Fig. 3) reciprocable on the shaft 9 toward the pulley 7 by lever 14 having fixed fulcrum 15 carried by bracket 16 mounted on cross member 18 of the main frame. This main frame is made up of parallel members 17, 18, centrally thereof, additional intermediate frame members 19, 20, and terminal or outer frame members 21, 22. Extending through these intermediate frame members is rod 23 connected to bell crank 24 at the frame 21 and to bell crank 25 at the frame 22. These bell cranks 24, 25, have protruding handles 26 which may be operated from either side of the platform 3 for throwing the clutch ring 10 and thereby effecting driving connection of the pulley 7 with the collar 13. This collar 13 is fixed with sleeve 27 loosely mounted on the shaft 9. This sleeve 27 has fixed therewith pulley 28 from which extends belt 29 (Fig. 3) to pulley 30 on shaft 31 carried by the frame members 17, 18. This shaft 31 has loosely mounted thereon bevel pinions 32, 33, as opposing each other and in mesh with intermediate bevel pinion 34.

Splined on this shaft 31 between these pinions 32, 33, is normally neutral clutch carrying sleeve 35 effective for clutching in pinion 32 or pinion 33 for driving from the shaft 31. Arm 36 of angle lever having fulcrum 37 mounted by bracket 38 from the frame member 17 has additional arm 39 engaged by link 40 extending to arm 41, of angle lever having fulcrum 42 mounted by the bracket 43 carried by the frame member 17. This arm 41 of the angle lever is fixed with arm 44 to which is connected operating rod 45 extending to angle levers 46 mounted in the frame members 21, 22, and provided with handles 47. Accordingly, operation may be effected from either side of the platform by throwing the handle 47 in one direction to clutch in the driving device for operating the jack in lifting operation and in the other direction for having the jack drive for lowering.

This driving of the jack or jack pair is effected through rotation of the pinion 34 on shaft 47' carried by brackets 48 (Figs. 3, 5) mounted on the frame member 17. This shaft 47' has worm 49 in mesh with worm wheel 50 on shaft 51 extending through the frame members 17, 18, 19, 20. This shaft 51 carries pinions 52. Guide blocks or keeps 53 embrace racks 54 holding such in mesh with these pinions 52. These racks 54 are connected respectively to upwardly extending arms 55 having fixed fulcra 56 carried by brackets 57 from the frame members 17, 18, 19, 20.

Also mounted on these fulcrum rods 56 and extending toward the shaft 31 are arms 58 maintained spaced from the arms 55 by links 59 having slotted connections 60 allowing slight independent lift as to the arms 55 in effecting setting of the clamp 60' before the driving action operation. This setting of the clamp 60' is effected by hand wheel 61 as fixed with threaded shaft 62 throwing wedges 63 into position for effecting the gripping holding of the clamp members of the jack pair. This clamping of the jack into position by the axle or axle housing is effected at once the vehicle is upon the platform 3. Then with the motor 4 started and the connections thrown for lifting operation, the load of the car as on the wheels 64 at the cradles is lifted clear thereof. The platform sections 2 are then removed. The jack or jack pair may then be lowered for setting the wheels 64 down in the respective cradles.

By throwing handle 65 at either side of the platform 3 such is effective through angle levers 66 to slide the rod 67 as mounted in the frame members 17, 18, 19, 20. This rod 67 is connected to lever 68 having fulcrum 69 carried by bracket 70 from the frame member 17. This lever 68 as thrown engages sleeve 71 and effects expansion of clutch ring 10 for connecting the pulley 7 with the main drive shaft 9. This main drive shaft 9 is mounted in bearings 72 carried by the frame sections 17, 18. This shaft 9 extends beyond these frames 17, 18, and there carries bevel pinions 73 as the driving element of a differential type of torsion dynamometer. In line with the shaft 9 are shaft sections 74 mounted in bearings 75, 76, in the frame members 19, 21, at one side and 20, 22, at the other side of this testing apparatus main frame. These shafts 74 inwardly carry bevel pinions 77 opposing the bevel pinions 73 as a planetary differential connection so that intermediate pinions 78 mounted on spider 79 in drum 80, with such drum at rest, may serve as transmission means from the main shaft 9 for driving the shafts 74. These shafts 74 between the frame members 19, 21, and 20, 22, carry fixed thereon pulleys 81 as the live or driving pulleys of the cradle. Over these pulleys 81 extend belts 82 passing about idler or follower pulleys 83 on shafts 84 mounted in bearings 85 carried by the frame members 19, 21, and 20, 22, respectively.

With these load wheels 64 of the vehicle resting down on the belt 82 as the cradles, and the pulleys 81 driving these cradles, there is given a live driving action as a load for spinning the driving wheels 64 in like manner as the momentum would carry the vehicle under speed. The depression of the cradle may be sufficient to hold the vehicle against being driven off the platform or conform to the wheel tread. The extent of this depression may be adjusted by tightener 86 as thrown against the lower reach of the belt by hand lever 87 having coaction with detent 88 for holding this belt 82 into the desired position. In the event driving action may tend to propel the vehicle, the clamp 60' is lowered to the desired amount of load, if not full load upon the cradle, and the clamp 60' may not necessarily be lowered clear of axle 89. With this clamp 60' in position adjacent the sides of the axle 89, the driving of the road wheels 64 regardless of speed may not be effective for shifting the vehicle off of the platform 3, and the slots 60 allow this to be a floating position.

Idle driving from the pulleys 7 as clutched in by sleeve 71 may effect, through a spinning of the cradles or belts 82, any torsion or load resistance applied against this travel of the belts 82 for setting service brake 90 or emergency brake 91 introduces resistance through the rotation of the wheels 64. This strain or load brings about a torsion tendency in the driving between the shaft 9 and the shaft 74. This load or torsion effects the dynamometer drum 80 and tends to rotate such drum 80. The normal rest position of the respective drums 80 is to have abutment 92 thereon against stop 93 carried by the respective frame members 17, 18. From such position of rest for the spider carrying drum 80, torsion load as applied tends to turn such drum on its bearings 72, 75. This turning or movement away from the stop is resisted by strap 94 extending from the drum 80 over secondary drum 95 on shaft 84' aligned with shaft 84 between the frames 17, 19, and between the frames 18, 20. Fixed with this drum 95 fast on the shaft 84' is cam 96 having fixed therewith strap 97 extending to tension helical spring 98 adjusted by thumb nut 99. This tension spring accordingly serves to hold the drum 80 yieldably against the stop 93. This adjustment of the spring 98 may be such as to hold the drum 80 against shifting under the friction load of the apparatus, or the friction load of the apparatus and the vehicle.

The configuration of cam 96 is such that it may compensate as the load builds up for determining the steps in the extension of the spring 98 in a way which may be advantageously calibrated. To this end fixed with the drum 95 and the cam 96 is pulley 100 having fixed thereon strap 101 extending to engage pulley 102 in one direction. An additional strap 103 about the pulley 100 extends in the reverse direction for anchoring with the pulley 102. One of these pulleys 102 is mounted on rod 104 extending through the frame members to the opposite sides of the frame and there carrying pointers 105 movable over scale providing dials 106. This shaft 104 in the instance shown provides the torsion dynamometer reading for the cradle at the left of the machine as coming up the incline 1. For the cradle at the right of the machine as coming up the incline 1, shaft 107 through the several members of the frame extends to terminal carried pointers 105 one at each side of the frame.

The frame members are assembled by five main rods 108 therethrough. From a common source of power, as the motor 4, the driving power effects motor driving. By the control mechanism readily accessible from either side of the dock or platform 3, the jack pair may be operated for positioning the vehicle in the pair of cradles 82. When the car is so positioned, the cradles may be driven for checking the operation of the wheels 64. This checking as herein disclosed, occurs independently, for there is independent registration for the respective dials 106 from the shafts 104, 107. When this condition of the normal freedom of the wheels 64 is determined, the service brake may be set and the condition measured at a desired traveling rate for the cradle 82. This may be determined by the control of the speed of the motor through switch 5. The torsion pull as registered through the torsion dynamometer and disclosed on the dials 106 is an indication of the holding tendency of the brake under actual operating conditions of wheel rotation momentum. This test may be of service brake 90, emergency brake 91, and the combined brakes. While conditions as disclosed are independent, recording thereof may occur and checking adjustment had therebetween and as taken into account, the brakes at the wheels may be reset. In some instances, with disc wheels, the resetting of the brakes involves removal of the wheels. Simple provision is made for taking care of such situation independently of removing the vehicle from the dock or platform 3. The jack lifting is brought into play and when the axle 89 is clear of wheel 64 from the respective cradles 82, the wheel 64 may be removed, and the brake adjustment given attention. The wheel replaced and lowering of the wheel back in the cradle permits a ready check on whether or not the adjustment made is the one required.

While the apparatus as herein disclosed is primarily designed for dynamometer testing of brakes, the machine may have added utility as for checking the friction load in the differential, propeller shaft, transmission, and even up to the motor. In such tests, the torsion load is readily disclosed by the dynamometers.

While the jack may be operated to lift the axle 89 for replacement of the platform section 2 to have the machine roll off the platform, under its own power or as shoved away, the jack may be lowered and the drive of the cradles effective for shifting the car off the platforms. When the car is to move off under its own power, independently of any operation of the cradle 82, eye-bolts 109 may be shifted into seats 110 in the respective pulleys 81 thereby holding the cradles against shifting.

The apparatus of this disclosure involves independent dynamometers—one for each cradle. The dynamometers may operate independently and as herein disclosed do operate independently although there is the common source of power which as transmitted through these differential type dynamometers imparts a common rotation speed to the separate cradles and to this end, is a feature approximating travel conditions for the wheels of the vehicle as in use. This same source of power as herein disclosed is effective through the jacks, to effect the holding, lifting, lowering and thus there is combined in a simple structure, equipment for handling a wide variation of vehicles in determining the comparative action between the traveling bed or cradle as to wheel pairs of such vehicles.

Rod 111 extends through the several parallel frame members 17, 18, 19, 20, 21, 22, and has on its outer ends weight providing handles 112, which, in clear or thrown away position, rest against stops 113 carried by the respective frames 21, 22. This bar or rod 111 between the frames 18, 20, and between the frames 17, 19, carries pawl 114. When the rod 111 is rocked by the arm 112 away from the stop 113, these pawls 114 are thrown to engage stops 92 on the respective dynamometer drums 80 for holding these stops or lugs 92 against the fixed stops or brackets 93. As the drums 80 are thus held there may be driving of the respective cradles 82 independently of disturbing the dynamometer apparatus as to any indication. This mode of operation is of value in those instances where it is desirable to run in a brake lining. For instance, a new lining may not be smooth and may have certain portions thereof uneven. By this device, such unevenness in the lining may be rubbed down to provide a substantially angularly uniform braking surface before actual testing is effected.

What is claimed and it is desired to secure by Letters Patent is:—

1. A load receiving cradle, a rotary driven member for actuating the cradle, means including a rotary driving member, a relatively shiftable spider therebetween, a holding strap for the spider, and a cam operable by said strap, and tension responsive means resisting pull of the strap on the cam.

2. A load receiving cradle, a rotary driven member for actuating the cradle, means including a rotary driving member, a relatively shiftable spider therebetween, a holding strap for the spider, a cam operable by said strap, and a spring resisting shifting of said cam.

3. A wheel load carrying cradle, a driving device, means including a clutch, means for operating said clutch for connecting the driving device to the cradle to connect said device for operating said cradle, a jack, and means including a clutch for connecting said jack to said driving device for lifting a wheel clear of the cradle.

4. A wheel load carrying cradle, a driving device, means including a clutch, means for operating said clutch for connecting the device to the cradle to connect said device for operating said cradle, an axle engaging jack, and means including a driving connection and a clutch for connecting said jack to said driving device for relieving the wheel cradle of load.

5. A pair of wheel load carrying cradles, a jack, a driving device, driving connections for connecting the driving device to the cradle and jack, and connections including reversible clutch means for connecting the device to operate the jack for shifting wheels clear of the cradles, and means for operating the clutch means.

6. An apparatus embodying a pair of cradles, an axle engaging jack adjacent said cradles, a driving device and means including a clutch mechanism and driving connections for connecting the driving device with the jack and cradle to cause their actuation.

7. An apparatus embodying a pair of cradles for engaging and driving wheels of a vehicle as carried by the vehicle axle against the resistance of the wheel brake, an axle engaging jack adjacent said cradles for relieving the cradles of the load of vehicle wheels, driving means for the cradle, and reversible mechanism for connecting the jack to said driving means for raising and lowering.

8. A brake testing apparatus embodying a pair of wheel engaging cradles, an axle engaging jack adjacent said cradles, means for driving the cradles against the resistance of the wheel brakes, reversible mechanism for connecting the jack with the driving means for raising and lowering, and control means for jack drive connection and for cradle driving connection.

9. An apparatus for testing brakes of a vehicle comprising a rotating means for the vehicle wheels including a system of gearing and a displaceable member adapted to support at least a portion of the gearing, means yieldingly resisting displacement of the member, a flexible element connected with the displaceable member, an indicator connected through the flexible element with the member, and means operable upon retardation of the wheel to displace said member and actuate the indicator.

10. An apparatus for testing brakes of automobiles and the like comprising a wheel rotating means, a power driven shaft, a system of gearing interposed between the shaft and wheel rotating means, a normally stationary support for the gearing and yielding means connected with the support, a flexible element connected with the normally stationary member, an indicator connected through the flexible element with the support, and means operable upon retardation of the wheel to move the support against the reaction of the yielding means and actuate the indicator.

11. An apparatus for testing brakes of automobiles and the like comprising a wheel rotating means, a power driven shaft, a planetary gear train directly connected to the wheel driving means and shaft, and means including a flexible element operable through the gearing to measure the retarding force applied to the wheel.

12. A brake testing apparatus for vehicles comprising a plurality of wheel rotating means other than the vehicle motor mechanism for turning the wheel against the resistance of its brake, differentials directly connected to each wheel rotating means, each differential having a displaceable member, and means connected through the displaceable member of one differential to measure the retarding force applied to one of the vehicle wheels.

13. A brake testing unit for testing the braking action on a vehicle wheel comprising a pair of rollers adapted to drive the wheel, a driving shaft for one only of the rollers, means to drive the other of said rollers from the shaft driven roller, a casing into which the roller shaft extends, a system of gears in the casing operatively connected with the roller shaft, means to drive the gears, a yielding means associated with the casing, and means operable upon retardation of the vehicle wheel to respectively displace the gears and thereby shift the casing, an indicator and means transmitting said shifting to the indicator.

14. An apparatus for testing the brakes of a vehicle comprising a wheel rotating means other than the vehicle motor, a system of gearing having relatively displaceable members operatively connected to said wheel rotating means, means adapted to support the displaceable gear members of the gearing, a yielding means connected to the support, a tension element connected with the support, an indicator operatively connected through the tension element with the support means, means operable upon retardation of the wheel to displace the support means and means connected with the support means and operated by movement thereof to actuate the indicator.

15. Brake testing apparatus for simultaneously testing two or more of the brakes of an automobile comprising, in combination, devices for simultaneously turning the wheels associated with said brakes against the resistance of the brakes, an indicator connected to each brake and wheel, means including gearing for driving the said devices simultaneously, and means operated by the reaction of the respective brakes on said gearing to cause relative displacement of the gearing and means operated by said displacement for actuating the corresponding indicators independently of each other.

16. A brake testing apparatus comprising, in combination, supports adapted for driving engagement with the wheels of an automobile and when so engaged acting to support the weight of an automobile, mechanism for driving the wheels on said supports and measuring the resistance of the brakes to the turning of the wheels, and means for lifting the automobile from said supports without removing it from the apparatus for the purpose of adjusting the brakes and then lowering the automobile for making additional tests of the brake resistance after the brakes are adjusted.

17. A brake testing apparatus comprising, in combination, supports adapted for driving engagement with the wheels of an automobile and when so engaged acting to support the weight of an automobile, a source of power, mechanism driven by said source for driving the wheels on said supports and measuring the resistance of the brakes to the turning of the wheels, and power means also driven by said source for raising the automobile from said supports without removing it from the apparatus for the purpose of adjusting the brakes, and then lowering the automobile for making additional tests of the brake resistance after the brakes are adjusted.

18. Brake-testing apparatus comprising, in combination, an incline up which a vehicle may be driven, a horizontal platform for supporting an automobile driven over said incline, and which is spaced ahead of said incline, wheel-supporting roller means in the space between the incline and the platform and substantially flush with the horizontal platform, and driving and measuring means for the roller means for driving a wheel on the roller means and indicating the resistance of the wheel brake to the driving of the wheel, together with a removable section bridging from the incline to the platform across said means.

19. Brake-testing apparatus comprising, in combination, devices for engaging and rotatably supporting the opposite side wheels of an automobile, means connected to said devices for measuring the resistance of the automobile brakes to the turning of the wheels, and a member having a hand-operated clamping means thereon positioned between said devices for supporting, engaging and holding the axle of the automobile.

20. Brake-testing apparatus comprising, in combination, devices for engaging and rotatably supporting the opposite side wheels of an automobile, means connected to said devices for measuring the resistance of the automobile brakes to the turning of the wheels, and means for positively preventing movement of the automobile lengthwise while the wheels are being driven by engaging, supporting, and holding a part of the automobile other than the wheels.

21. Brake-testing apparatus comprising, in combination, devices for engaging and rotatably supporting the opposite side wheels of an automobile, means connected with said devices for measuring the resistance of the automobile brakes to the turning of the wheels, a pivoted lever, a clamp associated with the lever and positioned between said devices for supporting and holding the axle of the automobile.

22. Testing apparatus comprising, in combination, devices for engaging and rotatably supporting the wheels at the opposite sides of an automobile, a motor for operating said devices, and means between said devices for raising and lowering the automobile, connections extending between said means and motor and actuated by said motor to effect said raising and lowering.

23. Testing apparatus comprising, in combination, devices for engaging and rotatably supporting the wheels at the opposite sides of an automobile, and power-operated means between said devices for raising and lowering the automobile, and including reversible driving mechanism and controlling means therefor at one side of said apparatus.

24. Testing apparatus comprising, in combination, devices for engaging and rotatably supporting the wheels at the opposite sides of an automobile, an axle gripping clamp, and means for operating said clamp to raise the wheels from said devices.

25. A brake testing apparatus comprising, in combination, devices for driving the wheels at the opposite sides of an automobile, and means between said devices including a hand-operated clamp for engaging the axle of the automobile and preventing horizontal movement of the automobile when the wheels are driven.

26. Testing apparatus comprising, in combination, a source of power, a device operable by said source for turning a wheel of an automobile, means also operable by said source for raising and lowering the automobile, and controlling means for connecting said source optionally to said device or to said raising and lowering means.

27. Testing apparatus comprising, in combination, a source of power, wheel engaging and rotating devices, driving connections between the source of power and devices operable by said source for turning the wheels of an automobile, and means also operable by said source for raising and lowering the automobile.

28. Testing apparatus comprising, in combination, devices for rotatably supporting the wheels of an automobile, means to actuate said devices including testing means connected therewith for measuring the resistance of the brakes to the turning of the wheels, and means for holding said testing means inoperative.

29. Testing apparatus comprising, in combination, a plurality of devices adapted for rotatably supporting and driving the wheels of an automobile, means including gearing for driving each of said devices independently of the other, and a plurality of indicators corresponding to the plurality of driving devices connected to the gearing and each of which indicators is operated directly by the thrust on the gearing in driving the corresponding wheel against the resistance of its brake.

30. Testing apparatus comprising, in combination, a plurality of devices for rotatably supporting and driving the wheels of an automobile, a set of gears, having relatively displaceable members, for driving each of said devices independently of the other, and a plurality of indicators corresponding to the plurality of driving devices and each of which indicators connected with a gear member and is operated by the thrust of one gear on another and displacement of said other gear in the same set in driving the corresponding wheel against the resistance of its brake.

31. Testing apparatus comprising, in combination, a plurality of devices for rotatably supporting and driving the wheels of an automobile, a set of gears having relatively displaceable members for driving each of said devices independently of the other, and a plurality of indicators corresponding to the plurality of driving devices and each of which indicators is connected to a displaceable gear member and is operated by the thrust of one gear on another and displacement of said other gear in the same set in driving the corresponding wheel against the resistance of its brake, together with a single motor driving both of said sets of gears.

32. Testing apparatus comprising, in combination, a plurality of devices for driving the wheels of an automobile against the resistance of their respective brakes, a set of gears driving each of said devices, a housing for each set of gears and which is moved angularly by the thrust of one of the gears of the set on another in overcoming the resistance of the corresponding brake means yieldingly restraining movement of the housing, and a plurality of indicators operated respectively by angular movement of said housings.

33. Testing apparatus comprising, in combination, a plurality of devices for driving the wheels of an automobile against the resistance of their respective brakes, a set of gears driving each of said devices, a housing for each set of gears and which is moved angularly by the thrust of one of the gears of the set on another in overcoming the resistance of the corresponding brake, means yieldingly resisting angular movement of said housings, means connected to the housing and operable by the angular movement of the several housings to measure the resistance of the corresponding brakes.

34. Testing apparatus comprising, in combination, a plurality of devices for driving the wheels of an automobile against the resistance of their respective brakes, a set of gears driving each of said devices, a housing for each set of gears and which is moved angularly by the thrust of one of the gears of the set on another in overcoming the resistance of the corresponding brake, and means yieldingly resisting angular movement of said housings, whereby the angular movement of the several housings measures the resistance of the corresponding brakes, together with a single motor driving said plurality of sets of gears.

35. Testing apparatus comprising, in combination a plurality of devices for driving the wheels of an automobile against the resistance of their respective brakes, a shaft driving each of said devices and each of which shafts is provided with a driven gear, a housing inclosing each gear and movable angularly about the axis of each of said shafts, other gears in said housings meshing with and driving the driven gears and arranged to react on the housings to turn them angularly about the shaft axes with forces in proportion to the resistances of the corresponding brakes, means yieldingly resisting movement of the housing, and indicating means operated by the reactions on said housings to show simultaneously the effectiveness of each of the several brakes.

36. Testing apparatus comprising, in combination, a device for driving the wheel of an automobile against the resistance of its brake, a shaft driving said device and which is provided with a driven gear, a closed housing inclosing said gear and movable angularly about the axis of said shaft, other gears in said housing meshing with and driving the driven gear and arranged to react on the housing to turn it angularly about the shaft axis with a force in proportion to the resistance of the brake, means to yieldingly restrain movement of the housing, and indicating means operated by the reaction on said housing to show the effectiveness of the brake.

37. Testing apparatus comprising, in combination, a device for driving a wheel against the resistance of its brake, a pair of coaxial alined shafts, one of which is power driven and the other of which is arranged to drive said device, gears on the adjacent ends of said shafts, a housing inclosing said gears and the adjacent shaft ends and which is movable angularly about the common axis of said shafts, means in said housing driven by the gear on the power-driven shaft and driving the other of said gears and which means is mounted on the housing in such a manner that the resistance of the brake reacts through said means with a force tending to turn the housing angularly and which force is in proportion to the brake resistance, and means operated by the reaction on said housing to show the effectiveness of the brake.

38. Testing apparatus comprising, in combination, a device for driving a wheel against the resistance of its brake, a pair of coaxial aligned shafts, one of which is power-driven and the other of which is arranged to drive said device, gears on the adjacent ends of said shafts, a support adjacent said gears and which is movable angularly about the common axis of said shafts, means carried by said support and driven by the gear on the power-driven shaft and driving the other of said gears and which means is so constructed and arranged that the resistance of the brake reacts through said means for a force tending to turn the housing angularly and which force is in proportion to the brake resistance, and means operated by the reaction on said housing to show the effectiveness of the brake.

39. Testing apparatus comprising, in combination, means including a pair of parallel rotatable wheel-supporting and driving members for driving a wheel against the resistance of its brake, a shaft driving at least one of said members, a driving shaft coaxial with said first shaft and arranged end to end with respect to the first shaft, intermeshing gear means connecting the adjacent ends of the two shafts and through which the driving shaft rotates the first shaft, a part shifted by the reaction on the intermeshing means of the brake resistance, means yieldably restraining shifting of said part and indicating means operated by said part to show the effectiveness of the brake.

40. Testing apparatus comprising, in combination, devices for rotatably supporting and driving the wheels at opposite sides of an automobile, with the brakes set, a driven shaft extending transversely across the apparatus and having its opposite ends adjacent said devices respectively, and gearing through which each end of the shaft drives the corresponding one of said devices and each of which gearings includes shiftable parts, means connected to and yieldingly resisting the shifting of said parts, said parts being operated by the reaction from the brake resistance and means also connected to said yielding means to measure the extent of shifting and thereby show the effectiveness of the corresponding brake.

41. Testing apparatus comprising, positively driven sets of gears and parts associated therewith adapted to simultaneously drive a plurality of automobile wheels against the resistance of their respective brakes and including a normally stationary part adjacent each wheel which is moved angularly by the thrust on the gears measuring the reaction from the brake resistance with a force which is in proportion to the brake resistance, and indicating devices cooperating with the said normally stationary part one operated by each of said parts.

42. A brake testing apparatus comprising in combination, a source of power, means for rotating a wheel of a vehicle, power transmission means between the source of power and the wheel rotating means including a detachable coupling, and means displaceable with respect to the wheel rotating means for supporting the vehicle, a driving connection between the source of power and said displaceable means, and a clutch connection in said driving connection.

43. A brake testing apparatus comprising in combination, separate means for rotating at least two wheels of a vehicle, means coupled with each wheel rotating means for measuring the resistance of the brakes and the turning of the wheels; means for supporting the vehicle and displaceable with respect to said wheel rotating means, a single source of power, a driving connection from the source of power to a wheel rotating means and vehicle supporting means operable to actuate said means simultaneously, a clutch mechanism in the driving connection and operable to permit independent actuation of the wheel rotating means.

44. A brake testing apparatus comprising in combination, a support for a portion of a vehicle, a wheel rotating means for turning a wheel against the resistance of its brake, a motor, driving connections from the motor to said support and wheel rotating means, clutching mechanism in said driving connections operable to effect relative displacement of the vehicle supporting and wheel rotating means.

45. A brake testing apparatus comprising in combination, rotating devices for turning a wheel of a vehicle against the resistance of its brake, a support for a part of the vehicle, a motor, driving connections from the motor to the wheel rotating means and support, and operable to effect relative displacement of said support and wheel rotating devices.

46. A load receiving movable cradle adapted to support a wheel having a brake, and a drive for said cradle, a planetary dynamometer coupled to the cradle and means operable in substantially a vertical direction to adjust the cradle to thereby vary the area of contact between the cradle and said wheel.

47. Testing apparatus comprising, in combination, means, including a pair of parallel, rotatable wheel supporting and driving members for driving a wheel against the resistance of its brake, driving means connecting said members for causing them to rotate in unison, a shaft directly driving one of said members, and driving the other member through said means, a driving shaft coaxial with said first shaft, and arranged end to end with respect to the first shaft, rotatably intermeshing means connecting the adjacent ends of the two shafts and through which the driving shaft rotates the first shaft, a part shiftable by the reaction on the intermeshing means of the brake resistance, means for yieldingly restraining said shiftable part, and means operated by said part to show the effectiveness of the brake.

HARRY K. BIGELOW.
NIELS M. HANSEN.